United States Patent [19]
Lochen

[11] 3,784,782
[45] Jan. 8, 1974

[54] WELDING GUN

[76] Inventor: Michel Chazles Lochen, 23, Boulevard de Magnan, Nice, France

[22] Filed: May 16, 1972

[21] Appl. No.: 253,903

Related U.S. Application Data
[63] Continuation of Ser. No. 60,005, July 31, 1970, abandoned.

[52] U.S. Cl. .............................................. 219/125
[51] Int. Cl. ............................................. B23k 9/12
[58] Field of Search ............... 219/124, 125 R, 137, 219/60 A, 61

[56] References Cited
UNITED STATES PATENTS

| | | | |
|---|---|---|---|
| 3,493,716 | 2/1970 | Martin | 219/125 R |
| 3,142,745 | 7/1964 | Gotch | 219/125 R |
| 3,159,734 | 12/1964 | Cooksey et al. | 219/125 R |
| 2,938,106 | 5/1960 | Hawthorne | 219/125 R |
| 2,868,953 | 1/1959 | Gardner, Jr. | 219/125 R |

Primary Examiner—R. F. Staubly
Assistant Examiner—L. A. Schutzman
Attorney—J. Maguire

[57] ABSTRACT

A welding gun for performing shielded arc welding of tubes to tubesheets, and having a rotatable electrode holder assembly which delivers both the welding current and the shielding gas to the electrode that travels in a circular path and arcs to the grounded workpiece.

4 Claims, 4 Drawing Figures

INVENTOR.
Michel Chazles Löchen 3,784,782

WELDING GUN

This is a continuation of application Ser. No. 60,005 filed July 31, 1970 now abandoned.

BACKGROUND AND SUMMARY OF THE INVENTION

The present invention relates in general to welding equipment and more particularly to a welding gun for performing inert gas shielded arc welding along circular paths, as in the automatic internal welding of tubes to tubesheets and the like.

There are a variety of prior art welding machines capable of doing tube-to-tubesheet welding operations, but many of these have one or more serious disadvantages such as excessive weight or bulk, and limited range of tube size capacity.

The invention provides a portable welding gun that is easily set-up and manipulated to weld inside tubes that are located in relatively close quarters, as for example, near the shell boundary of a tubesheet.

The welding gun of the invention has a portable barrel-type body equipped with a handle, and an electrode holder means supported by the body for rotation relative thereto about a central longitudinal axis. This electrode holder means can be further subdivided into a rotor assembly within the gun body and an interchangeable electrode holder connected to the rotor assembly for extension therefrom and bearing at one end of the electrode used for producing the arc, which is established between the tip of the electrode and the grounded tube and tubesheet workpiece combination. The electrode is received and adjustably supported by the electrode holder such that the electrode tip can be set at any radial distance from the rotation axis, within a limited range, for welding along an orbital path of corresponding radius, as needed for the particular tube size.

Both the welding current and shielding gas are delivered to the electrode through the holder and rotor assembly combination. Electric current from an external source is transmitted by a cable extending through the handle to a stationary ring supported by the gun body for wiping contact engagement with a conductive ring on the rotor assembly, the two rings serving as a rotary electric coupling whereby the current is transferred into conductive parts of the rotor assembly and thence into a conductive tube part of the holder which is conductively connected to the electrode itself.

A rotary fluid coupling is used to pass the shielding gas from a supply pipe extending in the handle into a system of communicating passages in the rotor assembly and electrode holder.

The gun body is adapted for connection to an adjustable fixture that engages reference surfaces to correctly position the electrode holder with respect to the intended welding path.

For a better understanding of the invention, reference should be had to the accompanying drawing in which there is illustrated a preferred embodiment of the invention.

DESCRIPTION OF A PREFERRED EMBODIMENT OF THE INVENTION

Figure 1:
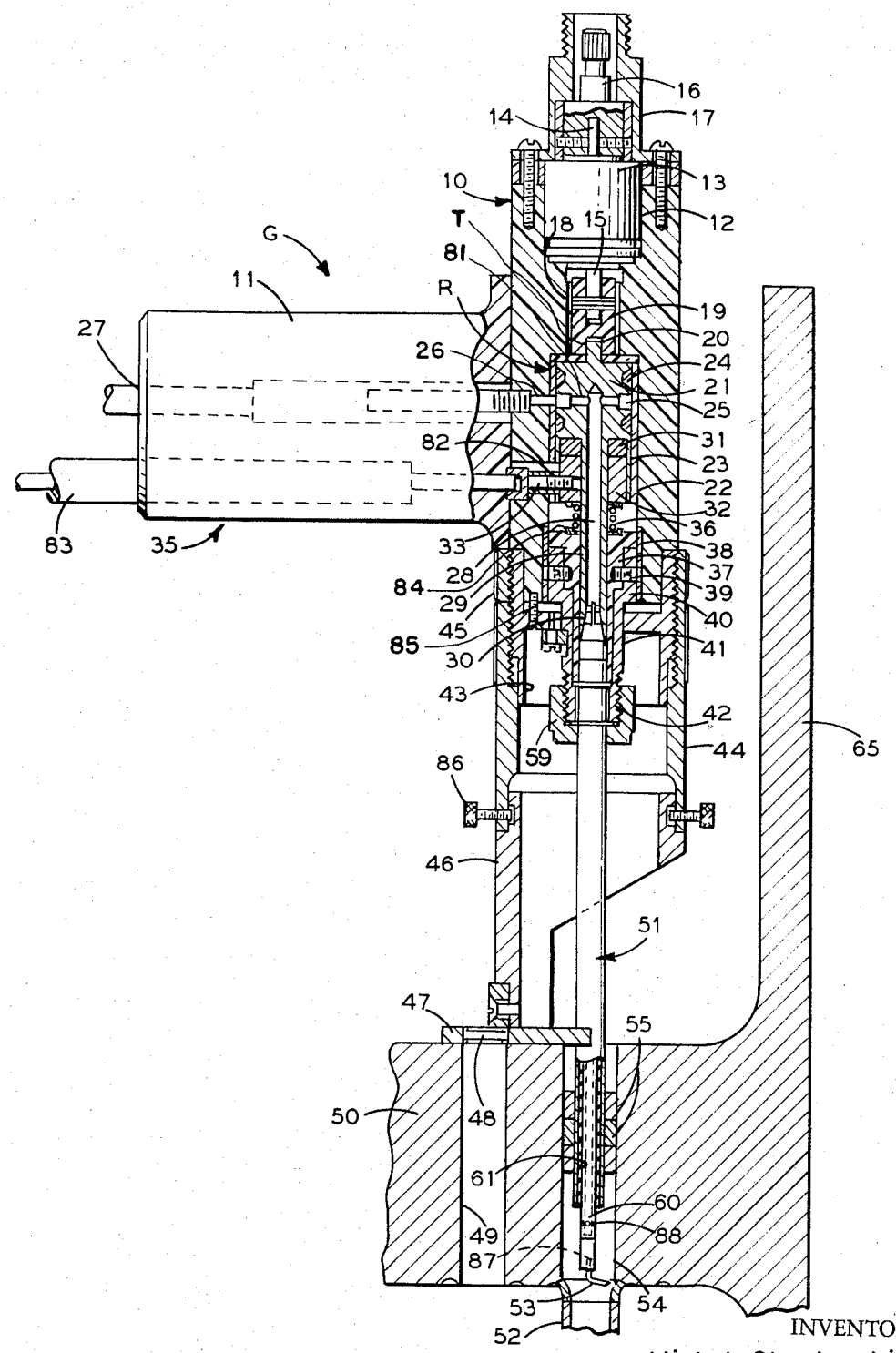
FIG. 1 is an elevation view, partly in section, of a welding gun constructed in accordance with the invention, as seen in a typical operating position for welding a tube to a tubesheet.
Figure 2:
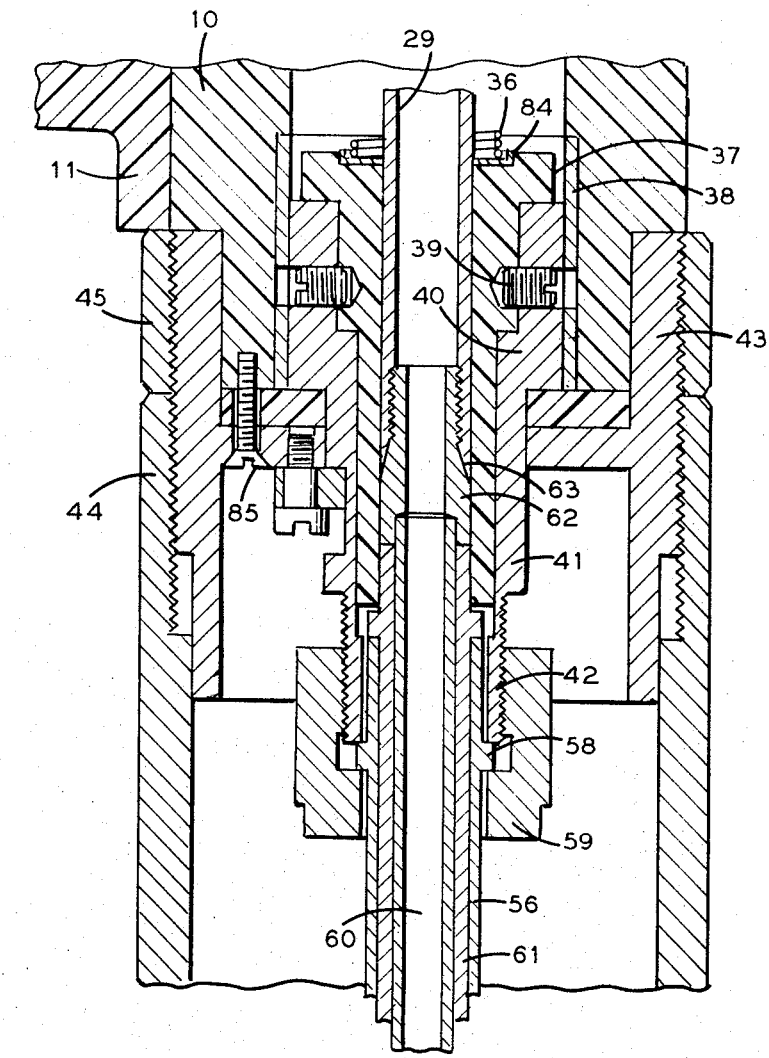
FIG. 2 is a detailed view of the welding gun shown in FIG. 1 and illustrating to a larger scale the arrangement for the releasably connected electrode holder in the welding gun.

In FIGS. 1 and 2 there is shown a welding gun G having a portable body 10 equipped with a handle 11, which body 10 and handle 11 are expediently made of a plurality of molded plastic parts secured together in a united assembly by conventional fastening means, such as screws (not shown).

Body 10 is generally cylindrical in external form and internally is provided with a succession of axially extending bored chambers of different diameters.

In a chamber 12 located at the rear end of body 10 is rotary motion transmission 13 having an input shaft 14, an output shaft 15, and internal means, such as speed reduction gears (not shown), that establish a given ratio between the rotation speeds of shafts 14 and 15. Chamber 12 is closed by a cap 17 housing a fitting 16 connected to shaft 14 and disposed for connection to a flexible shaft (not shown) such as a Bowden cable, to supply rotary motion to shaft 14 from a rotary motor means (not shown) external to the gun G. If desired, shaft 14 can be driven by a small electric motor supported by the body 10 and directly connected to the transmission 13.

At the bottom of chamber 12 there is a passage 18 communicating with a cylindrical chamber 22. Within chamber 22 is a rotor assembly R supported therein by a liner 23 for rotation relative thereto about longitudinal axis X. Rotor assembly R has a metal core piece 21 with a projecting tenon T. A coupling 19, made of electrical insulation material, and disposed in passage 18, is pin connected to shaft 15 and has an end slot 20 that receives the tenon T, such that the rotary motion of shaft 15 is applied to rotor motion R.

The rotor assembly R together with other parts connected thereto for rotation therewith, serves as an electrode holder means, and in accordance with the invention, the shielding gas used during welding operations with the gun G is passed to the electrode zone through the rotor assembly R. Fitted within handle 11 is a pipe 27, the outside end of which is disposed for connection as by a hose (not shown), to a source of whatever inert gas is to be used for shielding the arc. The inside end of pipe 27 communicates with a radial passage 26 in body 10. Passage 26 openly faces a circumferantial groove 25 upon core 21. A pair of O-ring seals 24 mounted upon core 21, one each side of groove 25, wipe against liner 23 to check gas leakage.

Core 21 has an elongated spindle 29 and an axially extending internal passage 28 that is communicated with groove 25 by a plurality of radially extending passages 81, such that the shielding gas flows through the rotary fluid coupling defined by passage 26 and groove 25, then passes through passages 81 and 28 to the bottom end 30 of spindle 29 where it is further conducted to the electrode zone.

Installed upon spindle 29 is a carbon ring 31, one end of which is in contact with core 21. The other end of ring 31 is disposed for wiping contact engagement with a metal ring 32 that is stationary with respect to body 10 and which has threads 82 for receiving a screw 33 that connects to ring 32 the end of an electric current supply cable 83 extending the through passage 35 in handle 11.

To assure good conduction of electric current into core 21 through the rotary electric coupling defined by rings 31 and 32, there is provided a spring 36 that is compressed between ring 32 and a spherical washer 84 seated upon the end of a guide bushing 37 installed upon spindle 29. The ring 32 is thus pressed against the ring 31 for good electrical contact therewith. Bushing 37 is made of an electrical insulation material, such as plastic, having good anti-friction properties, and is received inside a metal bearing body 40 having an axially extending prolongation 41 terminated by a threaded portion 42. Bearing 40 is connected to bushing 37 by set screws 39, and is received in a liner 38 installed in chamber 22.

At the forward, reduced diameter end of the body 10 is secured, as by screws 85, an externally threaded sleeve 43 upon which is screwed an internally threaded sleeve 44 and an internally threaded lock sleeve 45 that secures sleeve 44 in a selected axial position relation to sleeve 43 and body 10. The forward end of sleeve 44 is counterbored for a ring-base support piece 46 which is retained by lock screws 86 extending through tapped holes in sleeve 44.

The forward end of support piece 46 is connected to a fixture plate 47 which is adapted to bear against a reference surface such as a tubesheet 50.

Plate 47 has at least two affixed centering pins 48 each of which is arranged to engage in a corresponding hole 49 of tubesheet 50, the locations of which hole 49 are in accordance with a given dimensional layout pattern.. Two centering pins 48 on plate 47 will therefore establish a definite position of the longitudinal axis X of the welding gun G, and said pins 48 are spaced such that when engaged in their respective holes 49, the electrode holder 51 and axis X of gun G are centrally positioned in another hole 49 in which the welding of a tube 52 to tubesheet 50 is to be performed.

Preferably, plate 47 is provided with interchangeability features that will accept it for use with a variety of different tubesheet hole patterns.

Electrode holder 51 is connected to rotor assembly R for rotation in unison therewith, by means of a nut 59 screwed onto thread 42 of bearing 40.

The electrode holder 51 is hollow and assembled from a plurality of parts including an inner metal tube 60, a tubular sheath 61 of electrical insulation material surrounding and encasing tube 60, and an outer tubular sheath 56 made of metal. The inner tube 60 is expediently made of copper since it carries the welding current and also communicates with passage 28 through a connector nipple 62 brazed to the end of tube 60 and screwed into thread 63 of spindle 59. Nipple 62 is expediently tapered to fit into a similarly tapered end portion of spindle 29 there establishing both a gas-tight connection, and a high conductivity electrical connection between tube 60 and spindle 29.

At the forward end of tube 60 there is connected a removeable endpiece 54 that bears an electrode 53 used in creating the welding arc. Endpiece 54 is expediently threaded so as to screw into receiving threads of tube 60 to seal the end thereof. Electrode 53 is bent and received in a fitted hole 87 drilled in endpiece 54, parallel to the rotation axis X but eccentric thereto. The arc forming tip of electrode 53 thus travels in a circular path as electrode holder 51 turns and the radius of this path can be varied within limits by turning electrode 53 in hole 87 so as to change the distance between the tip of electrode 53 and rotation axis X to meet the requirement for welding different sizes of tube 52.

The gas delivered into tube 60 from passage 28 exits through a plurality of holes 88 located on tube 60 near the endpiece 54, so that the travelling arc formed by electrode 53 is shielded by the gas.

The outer sleeve 56 is preferably made of steel and serves to protect the insulation of sheath 61 from damage by abrasion. To give a more positive axial location to the electrode holder 51 with respect to the gun body 10 sleeve 56 has a collar 58 that is pressed against the end 42 of spindle 29 by nut 59.

To stabilize the rotation of the electrode holder 51 portion that extends into the tubesheet hole 49, there is provided one or more centering rings 55 that are slipped over sleeve 56 and secured thereto by friction.

Figure 3:
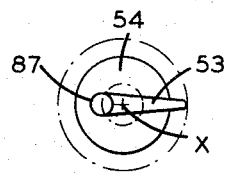
FIG. 3 is a schematic end view of the electrode holder in the gun of FIGS. 1 and 2 and showing a typical electrode received by such holder positioned for performing welding operations within minimum diameter sized tubes.
Figure 4:
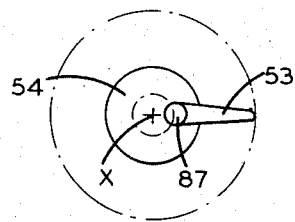
FIG. 4 is a schematic end view of the same electrode holder and electrode shown in FIG. 3, but with the electrode positioned for performing welding operations upon maximum diameter sized tubes.

In the operation of welding gun G, the electrode 53 is turned until its tip is positioned at the required radius from rotation axis X, and the actual tip radial distance can be checked using any suitable conventional gauge (not shown). It should be noted that the invention features an electrode 53 adjustment capability that allows the tip thereof to be set to travel in a circular path of any radius from the minimum radius shown in FIG. 3, up to the maximum radius shown in FIG. 4. The minimum radius position is attained by turning electrode 53 to overlie the axis X, such that the distance of the electrode 53 tip from axis is the radial length of electrode 53 (as measured from the tip to the center of hole 87) minus the distance between axis X and hole 87 center. Conversely, the maximum radius position is attained by turning electrode 53 exactly opposite to its minimum radius position such that the distance of electrode 53 tip from axis X is the electrode 53 radial length plus the hole 87 to axis X distance. As can be readily noted by the artisan, the range of adjustment is equal to twice the hole 87-to-axis X distance, regardless of electrode 53 radial length.

One advantage of the invention is that the welding gun G can be made light in weight and of small dimensions without sacrificing capability for automatic welding of tubes over a wide diameter range. A model of the gun G has been constructed with a capability for welding tubes of any diameter size from 11 millimeters to 40 millimeters. It should be noted that this diametral range can be most appropriately covered by using interchangeable electrode holders 51.

By using a cylindrical, barrel type body 10 configuration, it is possible to weld tubes close to the shell 65 boundary of the tube sheet 50, in typical cases as close as 26 millimeters.

What is claimed is:

1. A portable welding gun for use in making internal orbital welds at the junction of a tube and tube sheet comprising a portable body provided with a handle having separate means for the transfer of electrical energy and inert gas to the body, said body having an axial bore, a rotary motion transmission means fitted in the bore, a conductive rotor assembly fitted in the bore and coupled to the transmission means, the rotor assembly being formed with an axial passageway, rotary fluid coupling means supported by said body and flow connecting the gas transfer means with said axial passageway, rotary electric coupling means supported by said body and electrically connecting the electrical transfer means with said rotor assembly, an electrode holder secured to the rotor assembly, means for stabilizing the rotation of said holder, an electrically conductive tube extending through the holder, said tube having one end thereof communicating with the axial passageway and the other end formed with a plurality of circumferentially spaced radially projecting discharge portions, an electrode carrying end-piece detachably connected to said other end, and including a conduit penetrating the distal end face thereof and extending through a portion of the end-piece in a direction parallel to the axis of rotation thereof and eccentric thereto, said conduit being adapted to supportingly engage an end portion of the electrode wherein said electrode is adjustable relative to said axis of rotation to position the electrode tip at a given radius from the axis for welding along an orbital path of corresponding radius, and means for positively positioning said electrode holder with respect to the intended welding path.

2. A portable welding gun according to claim 8 wherein the means for stabilizing the rotation of said electrode holder includes a plurality of ring members disposed in fixed coaxially surrounding relationship to said holder.

3. A portable welding gun according to claim 8 wherein the means for positively positioning the electrode holder includes an interchangeable fixture plate connected to said body, the plate being provided with centering pins for separable engagement with a variety of reference holes.

4. A portable welding gun according to claim 8 wherein the means for positively positioning the electrode holder includes a first sleeve member disposed for engagement with said body at a selected axial position in relation thereof and a second sleeve member for securing the first sleeve member in said selected position.

* * * * *